United States Patent
Aftanas et al.

[19]

[11] Patent Number: 6,056,176
[45] Date of Patent: May 2, 2000

[54] VEHICLE ARTICLE CARRIER HAVING CLAMPING CROSS BAR

[75] Inventors: Jeffrey M. Aftanas, Sterling Heights; Donald R. Potter, Clarkston, both of Mich.

[73] Assignee: JAC Products, Inc., Ann Arbor, Mich.

[21] Appl. No.: 09/328,572

[22] Filed: Jun. 9, 1999

[51] Int. Cl.[7] .............................. B60R 9/045; B60R 9/05; B60R 9/04

[52] U.S. Cl. .......................... 224/321; 224/316; 224/325; 224/309; 224/326

[58] Field of Search ..................................... 224/316, 321, 224/325, 326, 329, 330, 331, 322, 309, 328

[56] References Cited

U.S. PATENT DOCUMENTS

| | | |
|---|---|---|
| 4,487,348 | 12/1984 | Mareydt . |
| 4,723,696 | 2/1988 | Stichweh et al. . |
| 4,982,886 | 1/1991 | Cucheran . |
| 5,275,320 | 1/1994 | Duemmler .............................. 224/331 |
| 5,492,258 | 2/1996 | Brunner .................................. 224/331 |
| 5,511,708 | 4/1996 | Cronce et al. . |
| 5,573,161 | 11/1996 | Stapleton . |
| 5,730,343 | 3/1998 | Settelmayer . |
| 5,732,863 | 3/1998 | Stapleton . |
| 5,732,864 | 3/1998 | Stapleton . |
| 5,758,810 | 6/1998 | Stapleton . |
| 5,791,536 | 8/1998 | Stapleton . |

*Primary Examiner*—Linda J. Sholl
*Attorney, Agent, or Firm*—Harness, Dickey & Pierce, PLC

[57] ABSTRACT

A vehicle article carrier including a cross bar having a pair of bracket assemblies at each end, where each bracket assembly includes a fixed jaw and a movable jaw which may be cooperatively clamped around a side rail of the article carrier system. The fixed jaw incorporates a keyed recess and the movable jaw incorporates a key. The construction of the keyed recess and the key enable the movable jaw to be pre-positioned so as to not interfere with placement of the cross bar onto the side rails during assembly. Clamping of each bracket assembly to its associated side rail is accomplished simply by turning a threaded fastener engaged with both jaw portions. The movable jaw is rotated automatically into alignment with the fixed jaw and its associated side rail. Further tightening of the fastening member automatically draws the movable jaw into clamping engagement with its associated side rail. The construction of the bracket assembly allows the cross bar to be secured much more quickly and easily to the side rails.

13 Claims, 5 Drawing Sheets

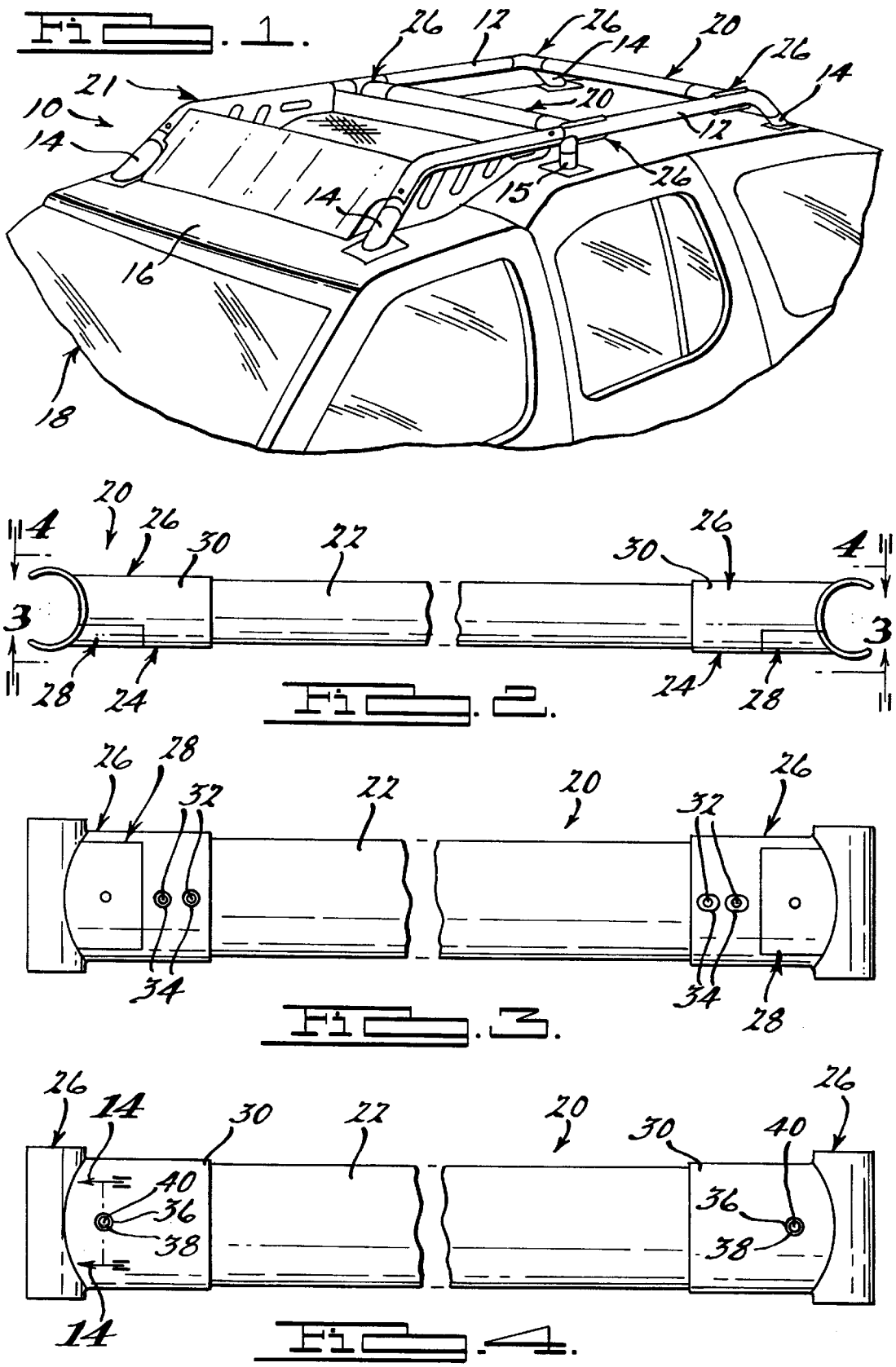

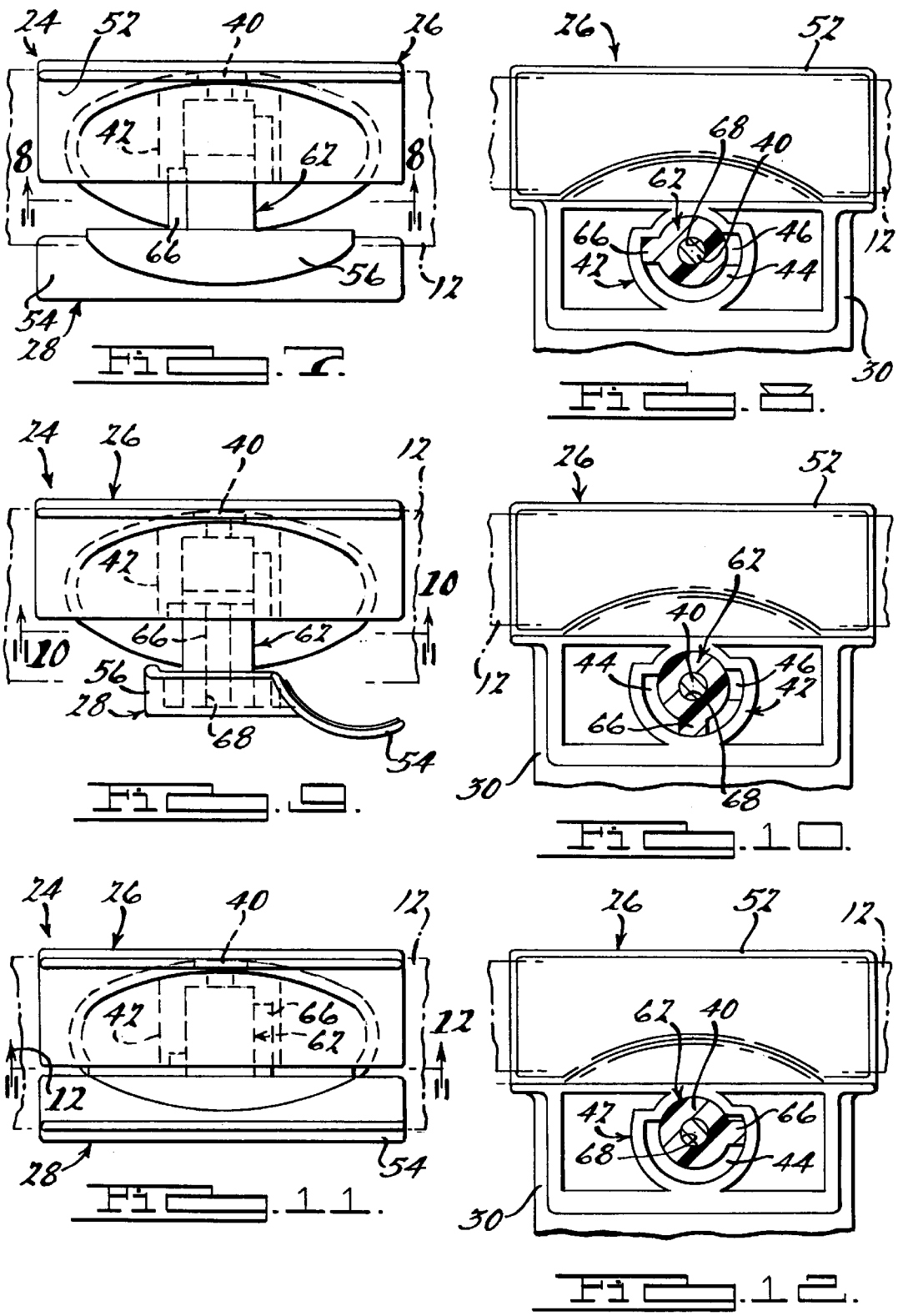

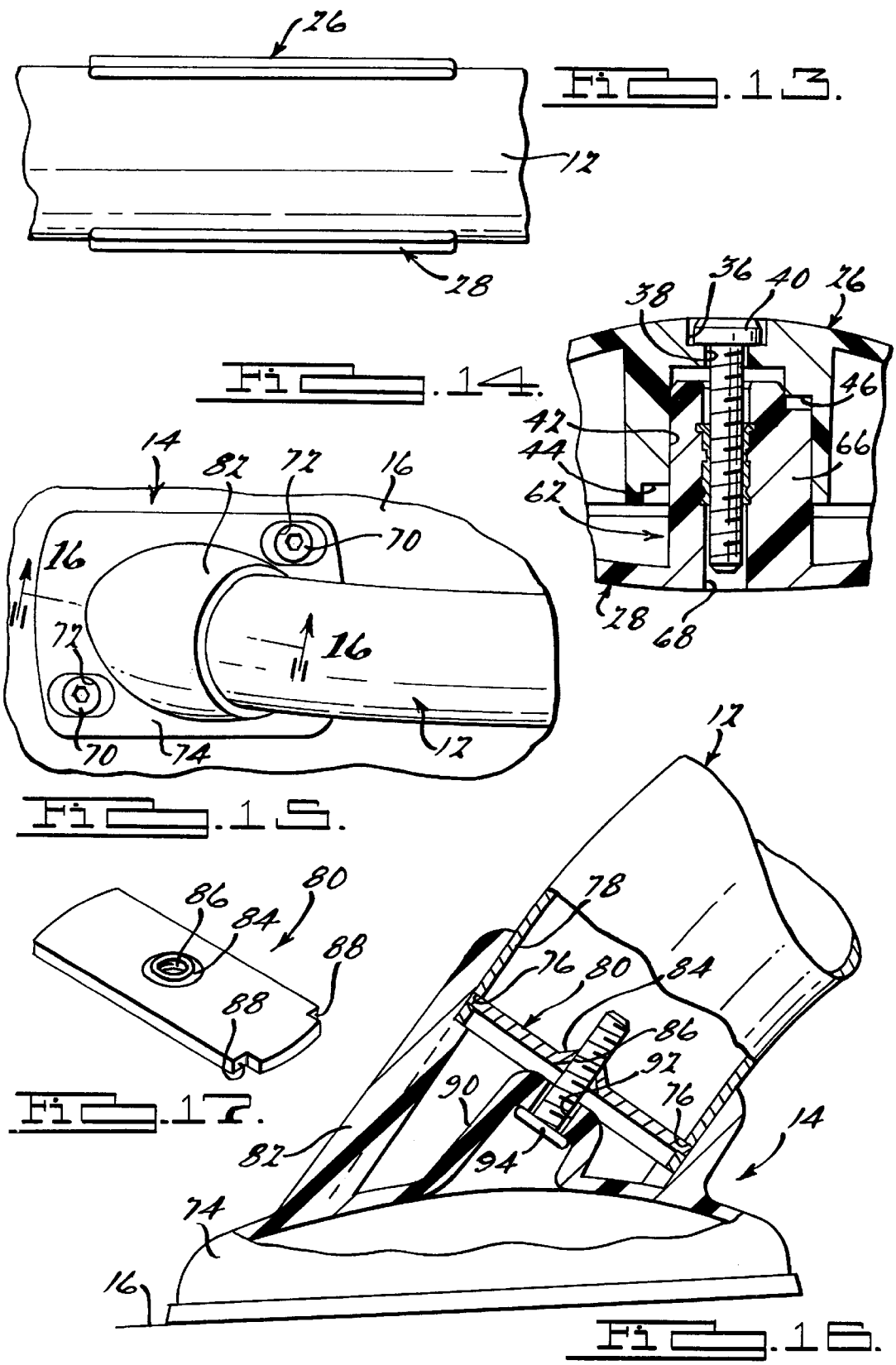

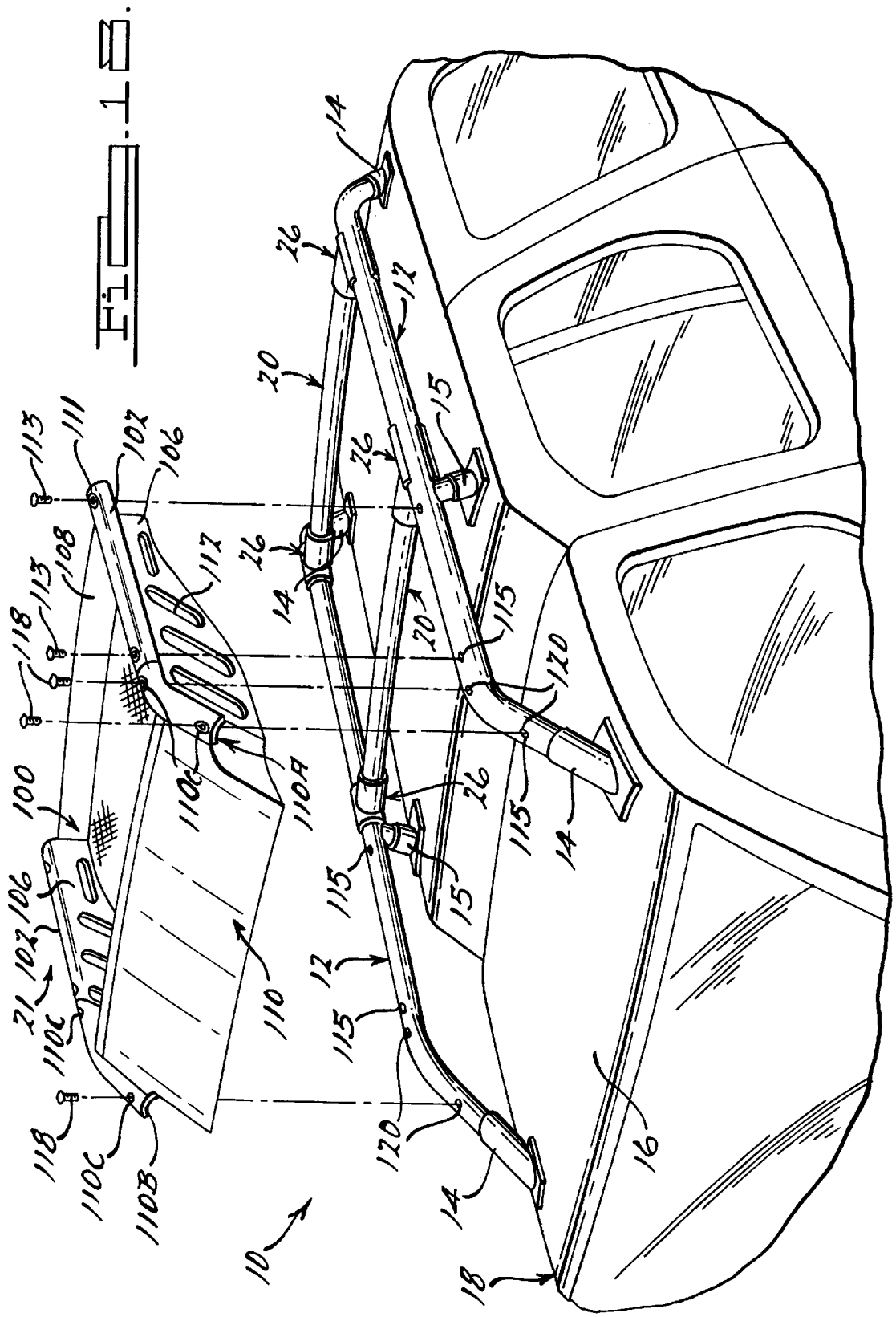

VEHICLE ARTICLE CARRIER HAVING CLAMPING CROSS BAR

CROSS REFERENCE TO RELATED APPLICATIONS

This application is related to U.S. application Ser. No. 09/328,330, filed concurrently herewith on Jun. 9, 1999, entitled "Vehicle Article Carrier Having Side Rail Mounting Support With Concealed Securing Member", pending.

BACKGROUND OF THE INVENTION

1. Technical Field

This invention relates to vehicle article carriers, and more particularly to a vehicle article carrier having at least one cross bar, where the cross bar includes a pair of jaw members which may be clamped to a side rail of the vehicle article carrier, and which further significantly eases assembly of the cross bar to the side rails of the vehicle article carrier.

2. Discussion

Vehicle article carriers are used in a wide variety of applications to support various articles above an outer body surface of the vehicle. Typically, such vehicle article carriers include at least one cross bar, and more typically a pair of cross bars, which are secured to a pair of parallel disposed slats or side rails. The slats or side rails are secured to the outer body surface so as to extend longitudinally along the outer body surface.

Many vehicle article carrier systems incorporate some form of bracket assembly at each end of the cross bar which allows the cross bar to be adjustably positioned along the slats or side rails. Often these bracket assemblies are fairly complex in construction and often are not able to be quickly assembled to the side rails or slats when the vehicle article carrier system is being installed on a vehicle either at a factory, at a dealership, or even by an end user.

Accordingly, it is therefore a principal object of the present invention to provide a vehicle article carrier incorporating at least one cross bar, where the cross bar includes a pair of bracket assemblies which can be quickly and easily attached to a pair of side rails of the vehicle article carrier.

It is a further object of the present invention to provide a vehicle article carrier which incorporates a cross bar having a pair of bracket assemblies, where each bracket assembly includes a fixed jaw and a movable jaw, and where the movable jaw may be pre-positioned prior to the cross bar being installed on a pair of side rails of the vehicle article carrier, to thereby enable the cross bar to be more quickly installed on the side rails.

It is still another object of the present invention to provide a vehicle article carrier incorporating at least one side rail, where the side rail includes a pair of bracket assemblies which are capable of being quickly and easily clamped to a pair of side rails to enable the cross bar to be easily repositioned along the side rails if needed.

SUMMARY OF THE INVENTION

The present invention relates to a vehicle article carrier incorporating at least one cross bar, where the cross bar includes at least one bracket assembly which can be clamped onto a side rail of the vehicle article carrier. More preferably, the vehicle article carrier includes a pair of cross bars with each cross bar having a bracket assembly at each end thereof capable of being clamped to a pair of parallel extending elevated side rails which are in turn fixedly secured to an outer body surface of the vehicle.

In the preferred embodiment, each bracket assembly includes a fixed jaw and a movable jaw which are secured together by a fastening member. One of the fixed or movable jaws include a key and the other includes a keyed recess. The keyed recess enables the key to be at least partially inserted thereinto such that its associated jaw can be secured to the other jaw of the bracket assembly. The keyed recess further includes a structure which permits the key to be rotated within the keyed recess to a predetermined point at which the key is able to fully engage within the keyed recess, thereby enabling the two jaws of the bracket assembly to be drawn towards each other into clamping engagement around one of the side rails via the fastening member.

The keyed recess and the key of the two jaws enable the movable jaw to be pre-attached to the fixed jaw in an orientation which allows the fixed jaw of the cross bar to be lowered onto the side rail without interference from the movable jaw, whereafter rotation of the fastening member causes a corresponding rotation of the movable jaw into a position aligned with the side rail. At this point further rotation of the fastening member causes the movable jaw to be drawn closer towards the fixed jaw and clamped around a portion of the side rail.

The keyed recess and the key, together with the fastening member, thus permit the jaws of a bracket assembly of a cross bar to be quickly and easily clamped to a side rail without requiring the movable jaws to be manually aligned by hand with the side rail before tightening the fastening member. Instead, the movable jaws can be pre-positioned so that they are clear of the side rails when the cross bar is positioned on the side rails, and then subsequently moved into clamping position automatically simply by rotating the fastening members at each bracket assembly in the direction for tightening the movable jaws to the fixed jaws. The friction between the fastening members and the movable jaws serves to cause the movable jaws to be automatically rotated into position to be clamped to the side rails, whereafter further tightening of the fastening members draws each of the movable jaws into clamping engagement with the side rails.

The present invention therefore significantly simplifies the attachment of the cross bars to the side rails, and further enables attachment to be accomplished even more quickly than with other forms of bracket assemblies.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a vehicle article carrier in accordance with a preferred embodiment of the present invention mounted on an outer body surface of a vehicle;

FIG. 2 is a front end view of one of the cross bars of the vehicle article carrier shown in FIG. 1;

FIG. 3 is a bottom plan view of the cross bar of FIG. 2 in accordance with directional arrow 3 in FIG. 2;

FIG. 4 is a top plan view of the cross bar of FIG. 2 in accordance with directional line 4 in FIG. 2;

FIG. 7 is an elevational end view of one end of the cross bar of FIG. 1 with the movable jaw in an open position and moved out of the way of the side rail, which is shown in phantom, thereby enabling the cross bar to be lowered onto the side rail without interference from the movable jaw;

FIG. 8 is a cross sectional view of the key of the movable jaw inserted partially into the keyed recess of the fixed jaw, in accordance with section line 8—8 in FIG. 7;

FIG. 9 is an elevational view of the movable jaw after having been rotated 90° from the position shown in FIG. 7 by a 90° turn of the fastener in the tightening direction;

FIG. 10 is a cross sectional view of a portion of the key disposed within the keyed recess taken in accordance with section line 10—10 in FIG. 9;

FIG. 11 is an elevational view of the bracket assembly of FIG. 9 with the movable jaw moved 90° from the position shown in FIG. 9 by an additional 90° of movement of the fastener in the tightening direction, and ready to be clamped over the side rail;

FIG. 12 is a partial cross sectional view illustrating a portion of the key within the keyed recess and taken in accordance with section line 12—12 in FIG. 11;

FIG. 13 is an elevational end view of the bracket assembly of FIG. 11 with the movable jaw and fixed jaw clamped to the side rail;

FIG. 14 is a partial cross sectional view taken in accordance with section line 14—14 in FIG. 4 illustrating the key within the keyed recess when the movable jaw is tightened securely to the fixed jaw of the bracket assembly;

FIG. 15 is a plan view of one of the support members used to secure the side rails to the outer body surface of the vehicle, and a portion of one of the side rails secured thereto;

FIG. 16 is a cross sectional side view in accordance with section line 16—16 in FIG. 15 illustrating the concealed coupling mechanism used to secure the side rail to the outer body surface of the vehicle;

FIG. 17 is a perspective view of the coupling plate used to secure one end of a side rail to the mounting member in a concealed fashion; and FIG. 18 is a perspective view of the storage bin shown in FIG. 1 removed from the side rails.

DETAILED DESCRIPTION OF THE PREFERRED EMBODIMENTS

Figure 5:
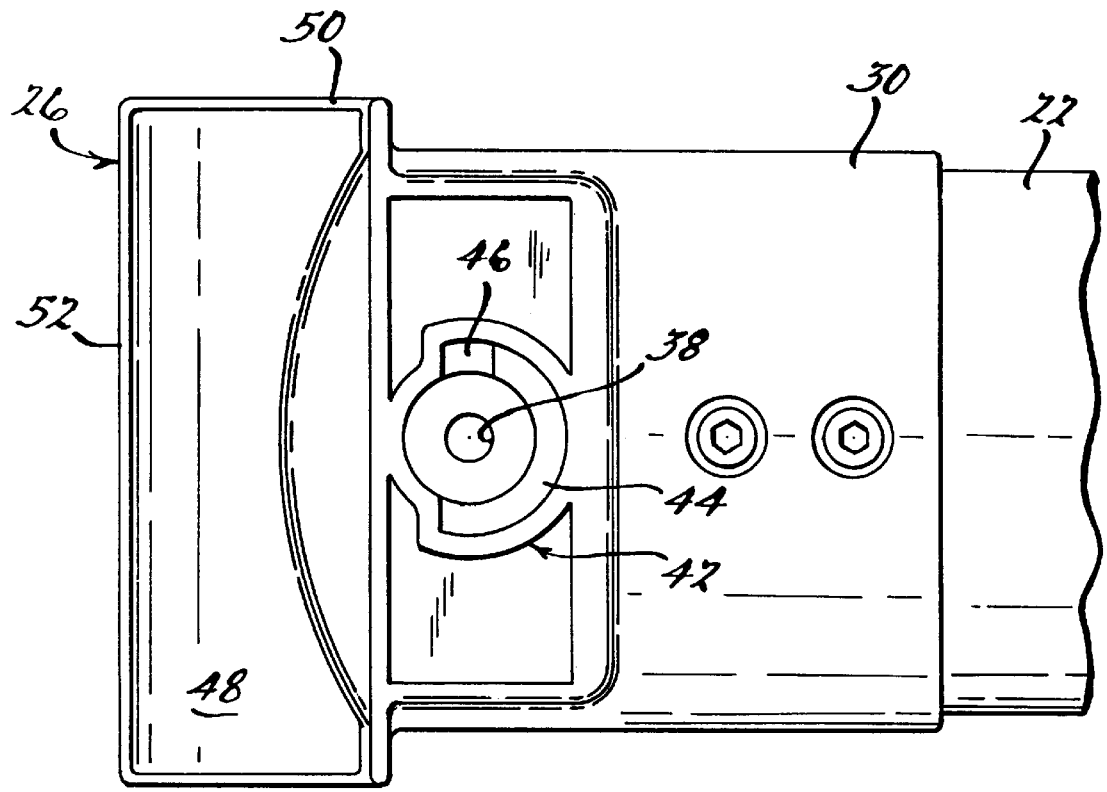
FIG. 5 is a fragmentary view of the cross bar of FIG. 3 with the movable jaw removed from the bracket assembly.

Referring to FIG. 1, there is shown a vehicle article carrier 10 in accordance with a preferred embodiment of the present invention. The vehicle article carrier 10 generally includes a pair of tubular side rails 12 which are secured via support members 14 to an outer body surface 16 of a motor vehicle 18. Center support members 15 (only one being visible in FIG. 1) provide additional support for each side rail 12. While the vehicle article carrier 10 is shown attached to a roof portion of the vehicle 18, it will be appreciated that the vehicle article carrier 10 could just as easily be secured to a rear deck lid of a vehicle or to any other outer body surface suitable for supporting the side rails 12 on the vehicle.

The side rails 12 are disposed generally parallel to one another along the main longitudinal length of the vehicle 18 and include at least one cross bar 20, and more preferably a pair of cross bars 20. In the preferred embodiment, the cross bars 20 are of identical construction and are each movable along the side rails 12 when not clamped tightly to the side rails 12. However, it will be appreciated that one of the cross bars 20 could be fixedly secured so as not to be movable along the side rails 12 if desired. A storage bin 21 is nestably disposed between the side rails 12 at a forward end of the side rails 12.

Referring to FIGS. 2–4, one of the cross bars 20 is shown in greater detail. Referring specifically to FIG. 2, the cross bar 20 includes a tubular central portion 22 having a bracket assembly 24 at each outermost end. Each bracket assembly 24 includes a fixed jaw 26 and a movable jaw 28. The fixed jaw 26 includes a neck portion 30 for receiving an end of the central portion 22 and is secured to the central portion 22 via a pair of threaded screws or other suitable fastening elements 32 extending through apertures 34 formed in the neck portion 30. Thus, the neck portion 30 is fixedly secured to the central portion 22. The elongated configuration of the slots 34 permit a slight degree of adjustment of the neck portion 30 relative to the central portion 22 to accommodate slight variations in the spacing of the side rails 12 when same are assembled to the outer body surface 16 of the vehicle 18 (FIG. 1).

With brief reference to FIG. 4, each neck portion 30 further includes a recess 36 having an opening 38. A threaded fastener 40 extends through the opening 38 and is used to hold the fixed jaw 26 and the movable jaw 28 together, which will be explained in greater detail in the following paragraphs.

Referring now to FIG. 5, each fixed jaw 26 further includes a keyed recess 42. The keyed recess 42 has an internal, partial circumferential shoulder portion 44, the purpose of which will be described momentarily, and a secondary access 46. Opening 38 is formed coaxially in the keyed recess 42 for accepting the fastener 40 (omitted in FIG. 5) therethrough. Optionally, but preferably, a thin rubber pad 48 is secured by a suitable adhesive to an inner surface 50 of a jaw portion 52 of the fixed jaw 26. The fixed jaw 26 is preferably formed from a suitable high strength plastic such as ABS plastic through a conventional injection molding technique.

Figure 6:
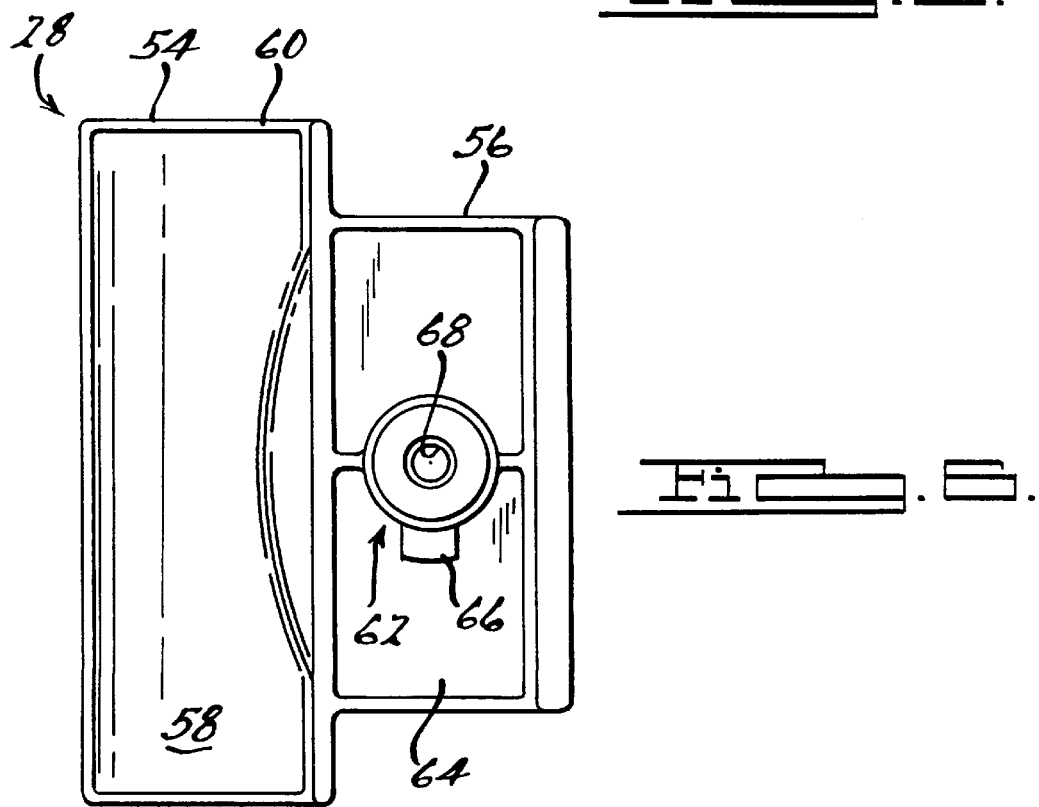
FIG. 6 is a plan view of the inside surface of the movable jaw of FIGS. 2 and 3.

Referring to FIG. 6, the movable jaw 28 is shown. The movable jaw 28 includes a jaw portion 54 and a flange portion 56. The jaw portion 54 likewise preferably includes a thin rubber pad 58 secured to an inner surface 60 thereof via a suitable adhesive. The flange portion 56 includes a key 62 projecting from an inner surface 64 thereof. The key 62 basically is a boss having a rib 66 which acts as a key when the movable jaw 28 is secured to the fixed jaw 26. The key 62 also includes a coaxially disposed aperture 68 which is preferably threaded, or which includes a threaded metal insert, for receiving the fastener 40. The movable jaw 28 is also formed as a single piece component, preferably from ABS plastic, through conventional injection molding techniques.

Referring to FIGS. 7–14, the assembly of one of the bracket assemblies 24 of the cross bar 20 to a portion of one of the side rails 12 will now be described. It will be appreciated that a principal advantage of the present invention is the ability to move the movable jaw 28 out of the way of the side rail 12 such that the fixed jaw 26 can be lowered onto the side rail without interference from the movable jaw 28 when assembling the cross bar 20 to the side rails 12. This eliminates the need for an individual assembling the cross bar 20 to the side rails 12 to manually position the movable jaw 28 at the precise, proper position before tightening the fastener 40. Thus, the construction of the bracket assembly 24 enables the bracket assembly 24 to be clamped to the side rail 12 much more quickly and efficiently than with previously developed bracket assemblies.

Referring specifically to FIG. 7, the movable jaw 28 is first secured to the fixed jaw 26 such that the jaw portion 54 is facing away from the side rail 12. This permits the cross bar 20 to be lowered straight down onto the side rails 12 such that the jaw portion 52 of each fixed jaw 26 rests directly on its associated side rail 12. Thus, there is no interference from either movable jaw 28 of the cross bar 20. Referring to FIG. 8, the internal shoulder portion 44 of the keyed recess 42 permits a portion of the key 62 to rest within the keyed recess 42 with the rib 66 resting directly on the shoulder portion 44. The shoulder portion 44 therefore prevents the key 62 from being inserted fully into the keyed recess 42. At this point the fastener 40 is holding the movable jaw 28 against the fixed jaw 26 with a minimal degree of force to prevent the movable jaw from inadvertently moving from the position shown in FIG. 7. Preferably, both movable jaws 28 will be secured in the orientation shown in FIG. 7 before the cross bar is positioned over the side rails 12 for securement thereto.

Referring to FIG. 9, the individual installing the cross bars 20 next further tightens the fastener 40. The friction between the threads of the fastener 40 and the aperture 68, which as described hereinbefore is threaded, causes a corresponding rotation of the movable jaw 28. FIG. 9 illustrates the movable jaw 28 rotated halfway (i.e., 90°) toward the position that is required before it can be drawn into clamping engagement with its associated side rail 12. FIG. 10 illustrates the shoulder portion 44 upon which the rib 66 rides while it is rotated, which prevents the key 62 from being fully inserted within the keyed recess 42.

Referring to FIG. 11, further tightening of the fastener 40 causes continued rotation of the movable jaw 28 into alignment with the fixed upper jaw 26. At this point the movable jaw 28 has been rotated 180° from the position shown in FIG. 7 and is ready to be clamped to the side rail 12. FIG. 12 illustrates that the rib 66 has cleared the shoulder portion 44 of the keyed recess 42 and has dropped into the secondary recess 46, which permits the key 62 to be fully inserted into the keyed recess 42.

Referring now to FIG. 13, the fastening member 40 has been rotated in the tightening direction even further, thus drawing the movable jaw 28 into clamping engagement with the side rail 12. With brief reference to FIG. 14, it can be seen that the key 62 is fully inserted within the keyed recess 42. It will be noted that the rib 66 is slightly shorter than the remainder of the key 62 which enables the key 62 to be partially inserted into the keyed recess 42 even when the rib 66 is not aligned with the secondary recess 46.

The bracket assemblies 24 of the cross bar 20 of the present invention thus provide a means for pre-aligning the movable jaws 28 such that same are held to the fixed jaws 26 in a position so as not to interfere with placement of the fixed jaws 26 directly onto the side rails 12 when assembling the cross bars 20 to the side rails 12. Once positioned on the side rails 12, the individual installing the cross bars 20 simply begins tightening the fasteners 40. The friction between the fasteners 40 and their corresponding movable jaws 28 causes a corresponding rotation of the movable jaws 28 until each becomes precisely aligned with its upper jaw 26 and its associated side rail 12. Continued tightening of each fastener 40 causes each of the movable jaws 28 to be drawn tightly against its associated side rail 12. Therefore, there is no need for the individual to manually align each movable jaw 28 while trying to tighten the fastener 44. The individual simply begins tightening the fastener 40 and the movable jaw is automatically rotated into position and then drawn into clamping engagement with its associated side rail 12 without any manual adjustment being required by the individual performing the installation.

The construction of the bracket assemblies 12 of the cross bar 20 significantly increases the speed and ease with which the cross bars 20 can be secured to the side rails 12. The bracket assemblies 24 also allow the cross bars 20 to be repositioned along the side rails much more quickly than with various other forms of cross bar bracket assemblies presently available. The cross bar 20 further has the advantage of comprising a very limited number of independent parts, which therefore further enhances the ease and speed of assembly of the cross bar 20 to the side rails 12.

Referring now to FIG. 15, one of the support members 14 is shown in greater detail. The support member 14 enables each outermost end of each side rail 12 to be secured thereto without any screws or other fastener elements being visible. The support member 14 is secured to the outer body surface 16 of the vehicle 18 by one or more threaded fastening members 70 which extend through openings 72 in a base portion 74. The fastening members 70 secure to threaded fastening assemblies mounted underneath the outer body surface 16 so that the support member 14 is securely affixed to the outer body surface 16. Once the support member 14 is attached to the outer body surface 16, the fasteners 70 are not visible from the side of the vehicle 18 unless an individual is in a significantly elevated position relative to the vehicle 18. The mounting members 14 preferably comprise single piece components made from high strength plastic, such as ABS plastic, from conventional injection molding techniques.

Referring to FIG. 16, a pair of rectangular opposing slots 76 are cut or otherwise formed at an outermost end portion 78 of each side rail 12. A mounting plate 80 having an overall length approximately equal to the outer diameter of the side rail 12 is inserted into end portion 78 of the side rail 12 prior to inserting the end portion 78 into a neck 82 of the support member 14. The mounting plate 80 preferably comprises a section of metal or other like, strong material having a recessed central portion 84 which includes a threaded aperture 86. The overall width of the mounting plate 80 is preferably just slightly less than the width of the slots 76.

The mounting plate 80 is shown in greater detail in FIG. 17 and includes notched corners 88 for easing the installation of thereof into the interior of the end portion 78 of the side rail 12. The depth of the notched corners 88 corresponds to approximately the thickness of the wall of the side rail 12.

With further reference to FIG. 16, the mounting member 14 further includes a projecting boss portion 90 having a centrally disposed opening 92. A threaded fastening element 94 is disposed through the opening 92 and into the threaded aperture 86 to draw the end portion 78 of the side rail 12 securely against an internal circumferential wall 96 formed inside the neck 82 of the mounting member 14. In this manner the side rail 12 is secured to the mounting member 14 without any screws or other like fasteners being visible from the side of the vehicle 18.

Referring now to FIG. 18, the storage bin 21 is shown in greater detail. The storage bin 21 is preferably formed as a two piece component from high strength plastic, such as ABS plastic. The storage bin 21 includes a bin portion 100 and an independent air dam 110. The bin portion 100 has a width just slightly less than the distance separating the side rails 12, and a pair of semi-circular arms 102 that have a radius of curvature slightly greater than the radius of curvature of the outside diameter of each of the side rails 12. In this manner the arms 102 can rest on portions of the side rails 12 while accommodating a degree of variability in the spacing of the side rails 12. Each of the arms 102 further has at least one slot-like opening, and more preferably a pair of slot-like openings 111 adapted to receive a corresponding plurality of external threaded fasteners 113. The fasteners 113 may be of the type that has a knob or handle portion such that a user can disengage it merely by grasping the knob or handle portion with a hand and turning, such that no external tools are needed to release the storage bin 21. The fasteners 113 are secured to threaded openings 115 in the side rails 12 and enable the entire storage bin 21 to be quickly removed if needed. The slot-like configuration of the openings 111 also helps to accommodate a slight degree of variability in the spacing of the side rails 12.

The storage bin 21 further includes a bottom wall 104 which is integrally formed with a pair of side walls 106 and with a rear wall 108. The front air dam 110 also includes a pair of semi-circular arms 110*a* and 110*b* which each have a radius of curvature preferably about equal to the semi-circular arms 102 of the bin portion 100. The semi-circular arms 110*a* and 110*b* further include one or more slot-like openings 110*c* which accommodate a slight degree of variability in the spacing of the side rails 12. The air dam 110 is secured preferably by threaded fasteners 118 to threaded openings 120 in a forward portion of each side rail 12. At least the side walls 106 and bottom wall 104 are formed with a plurality of openings 112 to allow air to pass therethrough and to enable water to drain out of the bin 21. The rear wall 108 may also include a plurality of openings if desired. The storage bin 21 thus forms a lightweight yet structurally strong component which can be easily removed from the side rails 12 if needed. The quick and convenient removability of the bin 21 permits a sunroof to be incorporated and used when the user removes the bin 21.

The storage bin 21 is ideally suited for transporting a wide variety of smaller items which are not as easily transported directly on the cross bars 20 or side rails 12. Such items may include, but are not limited to, wet suits used in diving or water-skiing activities or other items which may be wet after use. With such equipment, the openings 112 enable water to exit the storage bin 21 as well as to allow air to pass through the side walls 106. Other forms of sporting, camping or recreational equipment can also be carried easily within the storage bin 21. If desired, an external net could be secured over the storage bin 21 in connection with one or more conventional adjustable and/or elastic hold down straps.

It is an important advantage of the storage bin 21 that the width of the bin portion 100 is slightly less than the distance between the side rails 12. This enables the storage bin 21 to be nestably disposed between the side rails 12 and suspended by the arms 102. This configuration, together with the front air dam 110, provides the storage bin 21 with an extremely low, aesthetically appealing and aerodynamically efficient profile. This is in contrast to other forms of storage implements which are typically secured to the cross bars of an article carrier, and which therefore present a significantly protruding, aerodynamically inefficient, and often unaesthetically appealing profile.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus for supporting articles above an outer body surface of a vehicle, said apparatus comprising:

a pair of side rails disposed generally parallel to one another on said outer body surface;

at least one cross bar having a length sufficient to substantially span the distance between said side rails;

said cross bar including at least one end support assembly at one end thereof, said end support assembly including a fixed jaw and a movable jaw adapted to cooperably grasp onto a portion of said side rail;

a keyed recess formed in one of said fixed or movable jaws, and a key formed on the other one of the jaws for aligning said jaws relative to each other so as to be able to grasp said portion of said side rail when said jaws are aligned over said portion of said side rail;

a fastening member for securing said fixed and movable jaws in clamping engagement to said portion of said side rail;

and one of said key or said keyed recess including a surface providing a first degree of engagement between said key and said keyed recess, wherein said jaws are prevented from being drawn together by said fastener when not aligned over said side rail, and a second degree of engagement wherein said jaws are able to be clamped tightly to said portion of said side rail.

2. The apparatus of claim 1, wherein said key comprises a boss portion.

3. The apparatus of claim 1, wherein said key comprises a boss portion formed in said movable jaw and includes a recess for accepting at least a portion of said fastener; and wherein said fastener extends through a bore in said fixed jaw to secure said movable jaw in clamping relationship with said fixed jaw around said portion of said side rail.

4. The apparatus of claim 1, wherein said fixed jaw includes said keyed recess, said keyed recess further having a bore therethrough, and wherein said surface comprises a circumferential shoulder portion; and wherein said key comprises a boss portion having an opening for accepting a portion of said fastener.

5. The apparatus of claim 1, wherein said surface of said keyed recess includes a circumferential shoulder portion for enabling said movable jaw to be pre-tightened via said fastener;

whereupon friction between said fastener and said movable jaw, when said fastener is engaged with said movable jaw, causes said key of said movable jaw to move on said circumferential shoulder portion until said movable jaw is aligned with said portion of said side rail, whereupon said key is allowed to fully engage said keyed recess, thereby enabling said jaws to be fully tightened on said portion of said side rail.

6. A vehicle article carrier apparatus for supporting articles above an outer body surface of a vehicle, said apparatus comprising:

a pair of side rails disposed generally parallel to one another on said outer body surface;

at least one cross bar having a length sufficient to substantially span the distance between said side rails;

said cross bar including an end support assembly at each end thereof, each said end support assembly including:

a fixed jaw and a movable jaw adapted to cooperably grasp onto a portion of said side rail;

a keyed recess formed in one of said fixed or movable jaws, and a key formed on the other one of the jaws for aligning said jaws relative to each other so as to be able to grasp said portion of said side rail when said jaws are drawn toward one another;

a fastening member for securing said fixed and movable jaws in clamping engagement to said portion of said side rail; and said keyed recess including an internal, partial circumferential shoulder for allowing a first, limited degree of engagement of said key within said keyed recess even when said key is not aligned within said keyed recess, and full engagement within said recess when said key of said movable jaw is rotated into alignment with said keyed recess, thereby enabling said jaws to be tightened over said portion of said side rail only when said jaws are properly aligned over said portion of said side rail.

7. The apparatus of claim 6, wherein:

said movable jaw comprises a threaded opening;

said fixed jaw comprises a threaded bore; and said fastening member comprises a threaded fastener.

8. The apparatus of claim 6, wherein said each of said fixed and movable jaws include a semi-circular portion adapted to partially circumscribe said portion of said side rail.

9. The apparatus of claim 6, wherein said key comprises a boss having a rib portion, said rib portion having a length less than said boss to enable a portion of said key to be inserted into said keyed recess even when said key is not aligned with said keyed recess.

10. A vehicle article carrier apparatus for supporting articles above an outer body surface of a vehicle, said apparatus comprising:

a pair of side rails disposed generally parallel to one another on said outer body surface;

at least one cross bar having a length sufficient to substantially span the distance between said side rails;

said cross bar including a support assembly at each end thereof, each said support assembly including:

a fixed jaw and a movable jaw adapted to cooperably grasp onto a portion of said side rail;

a keyed recess formed in one of said fixed or movable jaws, and a key formed on the other one of the jaws for aligning said jaws relative to each other to be able to grasp said portion of said side rail when said jaws are drawn toward one another while one of said jaws is aligned over said portion of said side rail;

a fastening member for securing said fixed and movable jaws in clamping engagement to said portion of said side rail; and said keyed recess including an internal wall portion for enabling a first degree of engagement with said key when said key is not aligned with said recess, and a second degree of engagement when said key is aligned with said keyed recess;

said first degree of engagement preventing said jaw associated with said key from being clamped onto said portion of said side rail but enabling said jaw associated with said key to be rotated to a point in alignment with said jaw associated with said keyed recess; and said second degree of engagement allowing said jaw associated with said key to be fully clamped to said side rail.

11. The apparatus of claim 10, wherein said internal wall portion of said keyed recess includes an internal, partial circumferential shoulder for allowing said first degree of engagement of said key.

12. A cross bar for a vehicle article carrier for supporting articles above an outer body surface of a vehicle, wherein said cross bar is adapted to grasp onto a pair of side rails secured to said outer body surface, said cross bar comprising:

a central portion having a length substantially sufficient to span the distance between said side rails;

an end support assembly disposed at each end of said central portion;

each end support assembly comprising:

a fixed jaw;

a movable jaw;

a fastening member for drawing said fixed and movable jaws into clamping engagement with each other; a key formed on one of said fixed or movable jaws, and a keyed recess formed on the other of said jaws;

a surface formed within said keyed recess for permitting a first degree of engagement of said key within said keyed recess when said key is not aligned with said keyed recess, and a second degree of engagement when said key is aligned with said keyed recess, said first degree of engagement preventing said movable jaw from being drawn beyond a predetermined point toward said fixed jaw, and said second degree of engagement enabling said movable jaw to be drawn into full clamping engagement with said side rail.

13. The cross bar of claim 12, wherein said surface comprises a partial, circumferential shoulder within said keyed recess.

* * * * *